(12) United States Patent
Sarnaik et al.

(10) Patent No.: US 8,934,453 B1
(45) Date of Patent: *Jan. 13, 2015

(54) OFFLOADING MOBILE TRAFFIC FROM A MOBILE CORE NETWORK

(71) Applicant: Juniper Networks, Inc., Sunnyvale, CA (US)

(72) Inventors: Jagadishchandra Sarnaik, Gilroy, CA (US); Sreenivasa Tellakula, San Jose, CA (US); Ravi Nuguru, Cupertino, CA (US); Ujjvala Nangineni, Mountain View, CA (US); Jerome P. Moisand, Arlington, MA (US); Sanjay Wadhwa, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,045

(22) Filed: Apr. 29, 2013

Related U.S. Application Data

(63) Continuation of application No. 12/748,245, filed on Mar. 26, 2010, now Pat. No. 8,432,871.

(51) Int. Cl.
*H04W 4/00* (2009.01)
*H04W 28/02* (2009.01)

(52) U.S. Cl.
CPC .................. *H04W 28/0289* (2013.01)
USPC ...................................................... 370/331

(58) Field of Classification Search
USPC .......................................... 370/331, 237, 238
See application file for complete search history.

(56) References Cited

U.S. PATENT DOCUMENTS

| | | | |
|---|---|---|---|
| 7,787,443 B2 | 8/2010 | Varney et al. | |
| 8,432,871 B1 * | 4/2013 | Sarnaik et al. | 370/331 |
| 2004/0204095 A1 | 10/2004 | Cyr et al. | |
| 2005/0170816 A1 | 8/2005 | Pelaez et al. | |
| 2007/0232301 A1 | 10/2007 | Kueh | |
| 2008/0137541 A1 | 6/2008 | Agarwal et al. | |
| 2009/0005008 A1 | 1/2009 | Son et al. | |
| 2009/0041223 A1 | 2/2009 | Agarwal et al. | |
| 2009/0131017 A1 | 5/2009 | Osborn | |
| 2009/0232019 A1 | 9/2009 | Gupta et al. | |

(Continued)

OTHER PUBLICATIONS

Office Action from U.S. Appl. No. 12/853,707, dated Nov. 27, 2012, 19 pp.

(Continued)

*Primary Examiner* — Mohammad Anwar
(74) *Attorney, Agent, or Firm* — Shumaker & Sieffert, P.A.

(57) ABSTRACT

In general, the invention is directed to techniques for offloading mobile data traffic from a mobile core network to a broadband network. For example, as described herein, a breakout gateway forwards a service request from a mobile device and addressed to a service node. The service node designates an access point name (APN) for offload such that data traffic associated with service requests specifying the designated APN is to be offloaded to an offload network. The service node receives the service requests from the breakout gateway and, if the service request specifies the designated APN, the service node sends a request to the breakout gateway. The breakout gateway receives the request and assigns a routable PDP address to the mobile device. An offload module on the breakout gateway redirects mobile data traffic to the offload network when the source PDP address of the traffic is the previously assigned PDP address.

20 Claims, 7 Drawing Sheets

(56) References Cited

U.S. PATENT DOCUMENTS

| | | |
|---|---|---|
| 2010/0077102 A1 | 3/2010 | Lim et al. |
| 2010/0144363 A1 | 6/2010 | De Rosa et al. |
| 2010/0195621 A1 | 8/2010 | Kekki et al. |
| 2010/0222071 A1 | 9/2010 | Tafreshi et al. |
| 2011/0013566 A1 | 1/2011 | Aso et al. |
| 2011/0075633 A1 | 3/2011 | Johansson et al. |
| 2011/0075659 A1 | 3/2011 | Kant et al. |
| 2011/0075675 A1 | 3/2011 | Koodli et al. |
| 2011/0110378 A1 | 5/2011 | Savolainen et al. |
| 2011/0176531 A1 | 7/2011 | Rune et al. |
| 2011/0295996 A1 | 12/2011 | Qiu et al. |
| 2012/0177193 A1 | 7/2012 | Keller et al. |
| 2012/0224536 A1 | 9/2012 | Hahn et al. |

OTHER PUBLICATIONS

3GPP TS 23.060, V9.3.0, "General Packet Radio Service (GPRS); Service description," Stage 2, Release 9, Dec. 2009, 295 pp.

3GPP TS 25.413, V8.3.0, "UTRAN lu interface, Radio Access Network Application Part (RANAP) signalling," Release 8, Jun. 2009, 398 pp.

* cited by examiner

OFFLOADING MOBILE TRAFFIC FROM A MOBILE CORE NETWORK

This application is a continuation of U.S. application Ser. No. 12/748,245, filed Mar. 26, 2010, which is incorporated herein by reference in its entirety.

TECHNICAL FIELD

The invention relates to cellular networks and, more particularly, to offloading mobile traffic in a mobile service provider network.

BACKGROUND

A cellular radio access network is a collection of cells that each includes at least one base station capable of transmitting and relaying signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Cellular service providers convert cellular signals, e.g., Time Division Multiple Access (TDMA) signals, Orthogonal Frequency-Division Multiplexing (OFDM) signals or Code Division Multiple Access (CDMA) signals, received at a base station from mobile devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, mobile IP standardized by the Internet Engineering Task Force (IETF), as well as, other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile network includes GPRS core circuit-switched and packet-switched networks and a number of radio access networks that enable connectivity between mobile devices and the core networks. The core packet-switched network for the mobile network provides access to one or more packet data networks (PDNs), which may include, for example, the Internet, an enterprise intranet, and a service provider's private network. Various PDNs provide a variety of packet-based services to mobile devices, such as bulk data delivery, voice over Internet protocol (VoIP), Internet protocol television (IPTV), and the Short Messaging Service (SMS).

In addition to providing access to PDNs, the core packet-switched network for a service provider's mobile network also provides core support services for the packet-based services of the PDNs. Core support services enable and promote efficiency, security, mobility, and accounting for the packet-based services. GPRS support nodes (GSNs) within the core packet-switched network of the mobile network provider distribute the functionality of the core support services among Serving GSNs (SGSNs), which each serve groups of radio access networks that provide the front-end interface to the mobile devices, and Gateway GSNs (GGSNs), which are edge nodes logically located between the core packet-switched network and the PDNs. The SGSNs and GGSNs may perform, for example, authentication, session management, mobility management, compression, encryption, billing, and filtering for a service provider's GPRS core network.

SUMMARY

In general, techniques are described for offloading mobile data traffic in a mobile service provider network. For example, the techniques may be applied to offload mobile data traffic from a mobile core network of a mobile service provider to a broadband network, such as an existing broadband network of the mobile service provider. A breakout gateway device (BGW) is described herein that analyzes mobile data traffic in transit from a mobile device to the mobile core network. The BGW processes the mobile data traffic in real time and determines whether the mobile data traffic is associated with a type of network service that has been designated for "offloading." If so, the BGW dynamically redirects the mobile data traffic from the mobile core network to the broadband network. In this way, the offloaded mobile data traffic bypasses the mobile core network of the cellular service provider, thereby reducing loading experienced by the mobile core network and freeing resources for improved processing of other mobile traffic, such as voice calls or other communications.

Consistent with the described techniques, a mobile core network administrator or management device configures a Serving GSN (SGSN) of the mobile core network to designate the types of network services that are to be offloaded. A BGW may be deployed so that it is logically located on an interface that couples a RAN to an SGSN. In this case, the BGW operates as a transparent intermediate device that relays mobile control traffic from the RAN to the SGSN. In instances where the SGSN receives mobile traffic addressed to an offload APN and which requests a service, the SGSN returns that traffic to the BGW for assignation of a routing address to the requesting mobile device. The BGW provides the routing address to the mobile device via the SGSN. The BGW analyzes the mobile traffic and offloads, to a broadband network, mobile data traffic that is sourced from the assigned routing address. As a result, such mobile data traffic bypasses the SGSN and various services provided by the mobile core network.

In one embodiment, the invention is directed to a method comprising the steps of receiving, with a breakout gateway device positioned within a mobile service provider network, a first service request from a radio access network, wherein the first service request specifies a requested service supported by a packet data network (PDN). The method further comprises the step of forwarding the first service request from the breakout gateway device to a serving node of a mobile core network of the mobile service provider network, wherein the serving node couples the mobile core network to the radio access network to provide a first access path for the radio access network to the PDN. The method further comprises the step of receiving, with the breakout gateway device, data traffic associated with the requested service from the radio access network, wherein the data traffic is destined for the PDN. The method further comprises the step of bypassing the serving node by sending the data traffic from the breakout gateway device to an access node of an offload network that provides a second access path from the radio access network to the PDN.

In another embodiment, the invention is directed to a method comprising the steps of receiving, with a serving node that couples a mobile core network of a mobile service provider network to a radio access network to provide a first access path for the radio access network to a packet data network (PDN), first control traffic comprising a first service request from a mobile device served by the radio access network, wherein the first service request identifies a service supported by the PDN and comprises a first access point name, wherein the serving node exposes one or more access point names, wherein each of the access point names resolves to a gateway node of the mobile core network. The method further comprises the steps of matching the first service request to one of the one or more access point names exposed by the serving node based on the first access point name comprised by the service request, and sending a second control traffic, responsive to the first service request, comprising a second service request to a breakout gateway device when the matched one of the access point names is designated for offload, wherein an access point name being designated for offload causes the serving node to direct control traffic comprising a service request that specifies the access point name to the breakout gateway device, wherein the breakout gateway device comprises a node on a second access path from the radio access network to the PDN, wherein the second access path comprises an offload network and bypasses the serving node. The method further comprises the step of sending the second control traffic to a gateway node that provides a gateway to the PDN when the matched one of the access point names is not designated for offload.

In another embodiment, the invention is directed to a breakout gateway device positioned within a mobile service provider network, comprising a network interface to receive a first service request and data traffic associated with the requested service from a radio access network, wherein the first service request is addressed to a serving node of a mobile core network of the mobile service provider network and specifies a requested service supported by a packet data network (PDN), and wherein the data traffic is associated with the requested service and destined for the PDN. The breakout gateway device additionally comprises a discriminator to forward the first service request from the breakout gateway device to the serving node, wherein the serving node couples the mobile core network to the radio access network to provide a first access path for the radio access network to the PDN. The breakout gateway device further comprises an offload module to bypass the serving node by sending the data traffic from the breakout gateway device to an access node of an offload network that provides a second access path from the radio access network to the PDN.

In another embodiment, the invention is directed to a serving node device that couples a mobile core network of a mobile service provider network to a radio access network to provide a first access path for the radio access network to a packet data network (PDN), comprising a network interface to receive first control traffic comprising a first service request from a mobile device served by a radio access network, wherein the first service request identifies a service supported by the PDN and comprises a first access point name. The serving node device further comprises one or more access point names, wherein each of the access point names resolves to a gateway node of the mobile core network, and wherein an access point name designated for offload causes the serving node device to direct control traffic comprising a service request that specifies the access point name to a breakout gateway device. The serving node device additionally comprises a switch to match the first service request to one of the one or more access point names based on the first access point name comprised by the service request, wherein the switch sends a second control traffic, responsive to the first service request, comprising a second service request to the breakout gateway device when the matched one of the access point names is designated for offload, wherein the switch sends the second control traffic to a gateway node that provides a gateway to the PDN when the matched one of the access point names is not designated for offload, and wherein the breakout gateway device comprises a node on a second access path from the radio access network to the PDN, wherein the second access path comprises an offload network and bypasses the serving node.

In another embodiment, the invention is directed to a system comprising a serving node device that couples a mobile core network of a mobile service provider network to a radio access network to provide a first access path for the radio access network to a packet data network (PDN). The system further comprises a breakout gateway device, positioned within the mobile service provider network, that comprises a node on a second access path from the radio access network to the PDN, wherein the second access path comprises an offload network and bypasses the serving node, wherein the breakout gateway device receives a first service request from the radio access network, wherein the first service request comprises a first access point name that specifies a requested service supported by a packet data network (PDN), forwards the first service request to the serving node, receives data traffic destined for the PDN and associated with the requested service from the radio access network, and bypasses the serving node by sending the data traffic from the breakout gateway device to the access node. In the system, the serving node receives the first service request from the breakout gateway, matches the first access point name to one of one or more access point names exposed by the serving node, and sends a second control traffic to the breakout gateway device, responsive to the first service request, when the matched one of the access point names is designated for offload, wherein an access point name being designated for offload causes the serving node to direct control traffic comprising a service request that specifies the access point name to the breakout gateway device.

The techniques herein described may present one or more advantages. For instance, in some environments a significant portion of mobile traffic (e.g., flat-rate data traffic) may not require the extensive services provided by a mobile core network of a cellular service provider. Selectively offloading mobile data traffic from a mobile core network to an alternate broadband network may relieve the mobile service provider from outlaying the resources, such as additional support nodes, processing power, and bandwidth, that would otherwise be needed to apply core support services to the offloaded mobile traffic. Furthermore, by retaining an SGSN as an integral part of the control path between the RAN and BGW, the described techniques may preserve existing relationships between control nodes and the functionality of the current mobile infrastructure, including mobility support for the mobile devices.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
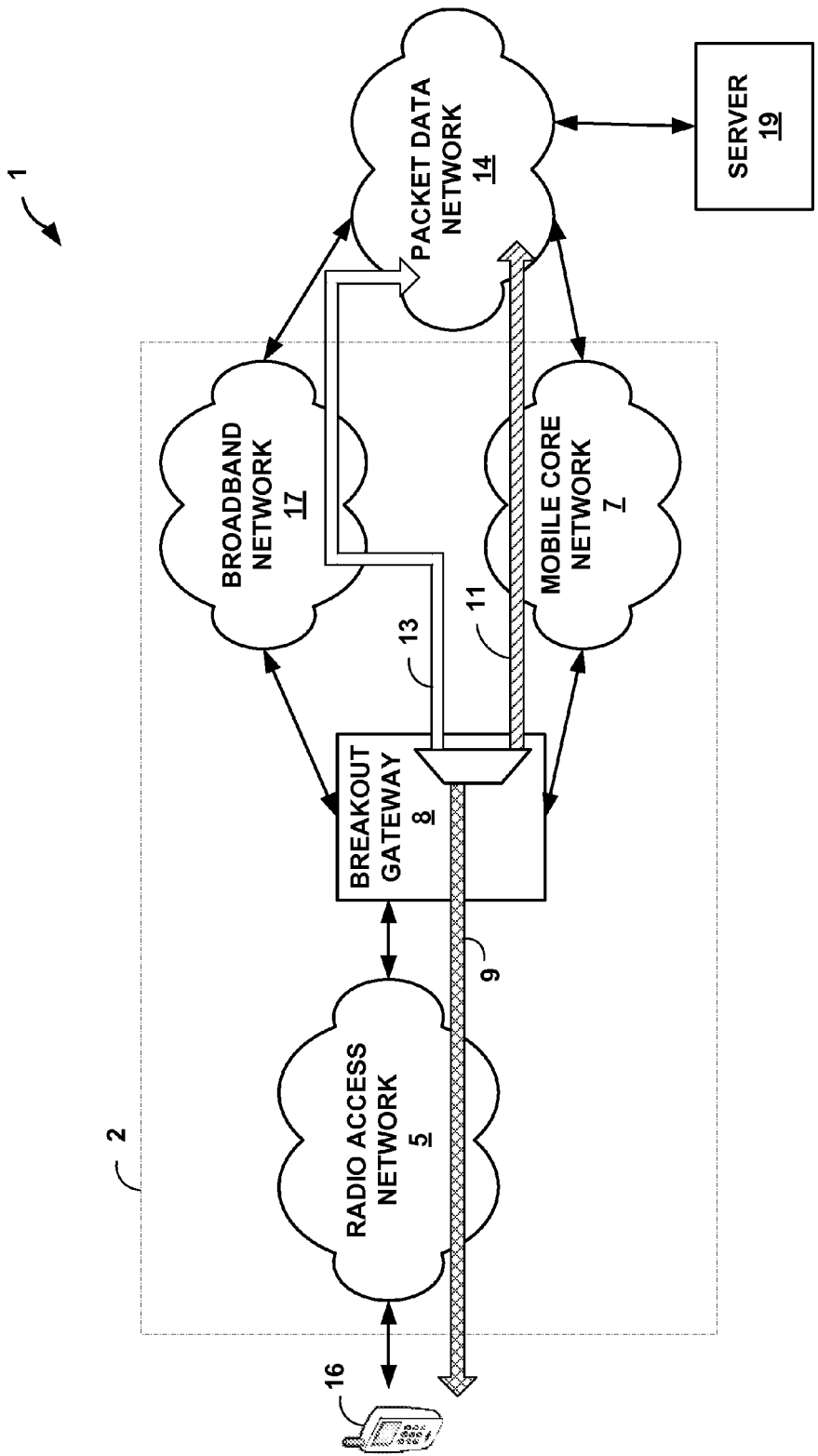
FIG. 1 is a block diagram illustrating an example network in which a breakout gateway offloads mobile traffic according to techniques herein described.

FIG. 1 is a block diagram illustrating an exemplary network system 1 operating according to the described techniques. In this example, network system 1 comprises packet data network (PDN) 14, server 19, mobile service provider network 2, and mobile device 16. Packet data network 14 supports one or more packet-based services provided by server 19 that are available for request and use by mobile device 16. As examples, PDN 14 in conjunction with server 19 may provide bulk data delivery, voice over Internet protocol (VoIP), Internet protocol television (IPTV), Short Messaging Service (SMS), and Wireless Application Protocol (WAP) service. Packet data network 14 may comprise, for instance, a local area network (LAN), a wide area network (WAN), the Internet, a virtual LAN (VLAN), an enterprise LAN, or some combination thereof. In various embodiments, PDN 14 is connected to a public WAN, the Internet, or to other networks. Packet data network 14 executes one or more packet data protocols (PDPs), such as IP (IPv4 and/or IPv6), X.25 and Point-to-Point Protocol (PPP), to enable packet transport for server 19 services.

Mobile device 16 is a wireless communication device that may comprise, for example, a mobile telephone, a laptop or desktop computer having, e.g., a 3G wireless card, a wireless-capable netbook, a video game device, a pager, a smart phone, or a personal data assistant (PDA). Mobile device 16 may run one or more applications, such as mobile calls, video games, videoconferencing, and email, among others. Certain applications running on mobile device 16 may require access to services supported by PDN 14.

Mobile service provider network 2 comprises mobile core network 7, radio access network 5, and broadband network 17. Radio access network 5 manages a wireless communication link and provides wireless communication services to mobile devices, including mobile device 16. Radio access network 5 transports datagrams between mobile device 16 and mobile core network 7 across a shared interface. Radio access network 5 may comprise, for example, a GSM radio access network (GRAN) or a Universal Mobile Telephony Service (UMTS) terrestrial radio access network (UTRAN) operating according to respective radio access network standards set forth by the relevant standards-setting body (e.g., 3GPP).

Mobile core network 7 provides session management, mobility management, and transport services between radio access network 5 and PDN 14 to support access, by mobile device 16, to PDN 14 services. Mobile core network 7 may comprise, for instance, a general packet radio service (GPRS) core packed-switched network, a GPRS core circuit-switched network, an IP-based mobile multimedia core network, or another type of transport network. Mobile core network 7 comprises one or more packet processing nodes to support firewall, load balancing, billing, deep-packet inspection (DPI), and other services for mobile traffic traversing the network.

Broadband network 17, like mobile core network 7, provides transport services between radio access network 5 and PDN 14. Broadband network 17, in various examples, may comprise an asymmetric digital subscriber line (DSL) network, WiMAX, a T-1 line, an Integrated Service Digital Network (ISDN), wired Ethernet, or other type of broadband network. In some embodiments, broadband network 17 is not a member of the mobile service provider network. For example, broadband network 17 may be a member of another mobile service provider network or another packet-based network.

According to the techniques described, mobile service provider network 2 further comprises breakout gateway 8 ("BGW 8"), situated on an interface shared by radio access network 5 and mobile core network 7, to offload mobile traffic from mobile core network 7 onto broadband network 17. BGW 8 may be an independent service node operating within or at the edge of radio access network 5 or mobile core network 7. In some embodiments, BGW 8 is a component or module of a service node of radio access network 5 or mobile core network 7.

BGW 8 and mobile core network 7 cooperate to establish an offload data path 13 for selected service-related communications exchanged between mobile device 16 and PDN 14. Once established, BGW 8 redirects mobile traffic, corresponding to the selected communications, onto broadband network 17 for transport to PDN 14. Similarly, BGW 8 advertises an offload routing identifier (e.g., an IP address) to enable PDN 14 to route the selected service traffic to BGW 8 via broadband network 17. As a result, whereas standard data path 11 is an access path for mobile traffic from mobile device 16 to PDN 14 that traverses mobile core network 7, offload data path 13 is an access path for mobile device 16 to PDN 14 that traverses broadband network 17.

The techniques of this disclosure may provide certain advantages. For instance, in the absence of the techniques described herein, mobile core network 7 may apply services (e.g., load balancing) to mobile traffic that does not require such services. In such instances, mobile core network 7 must scale correlative to increasing mobile traffic, requiring capital expenditures for additional service providing nodes to meet increasing demand. The techniques described may allow diversion of selected mobile traffic to a low-cost, high-volume network (e.g., broadband network 17), thereby bypassing mobile core network 7 and with it, the relatively high costs of applying unnecessary services to the mobile traffic.

Figure 2:
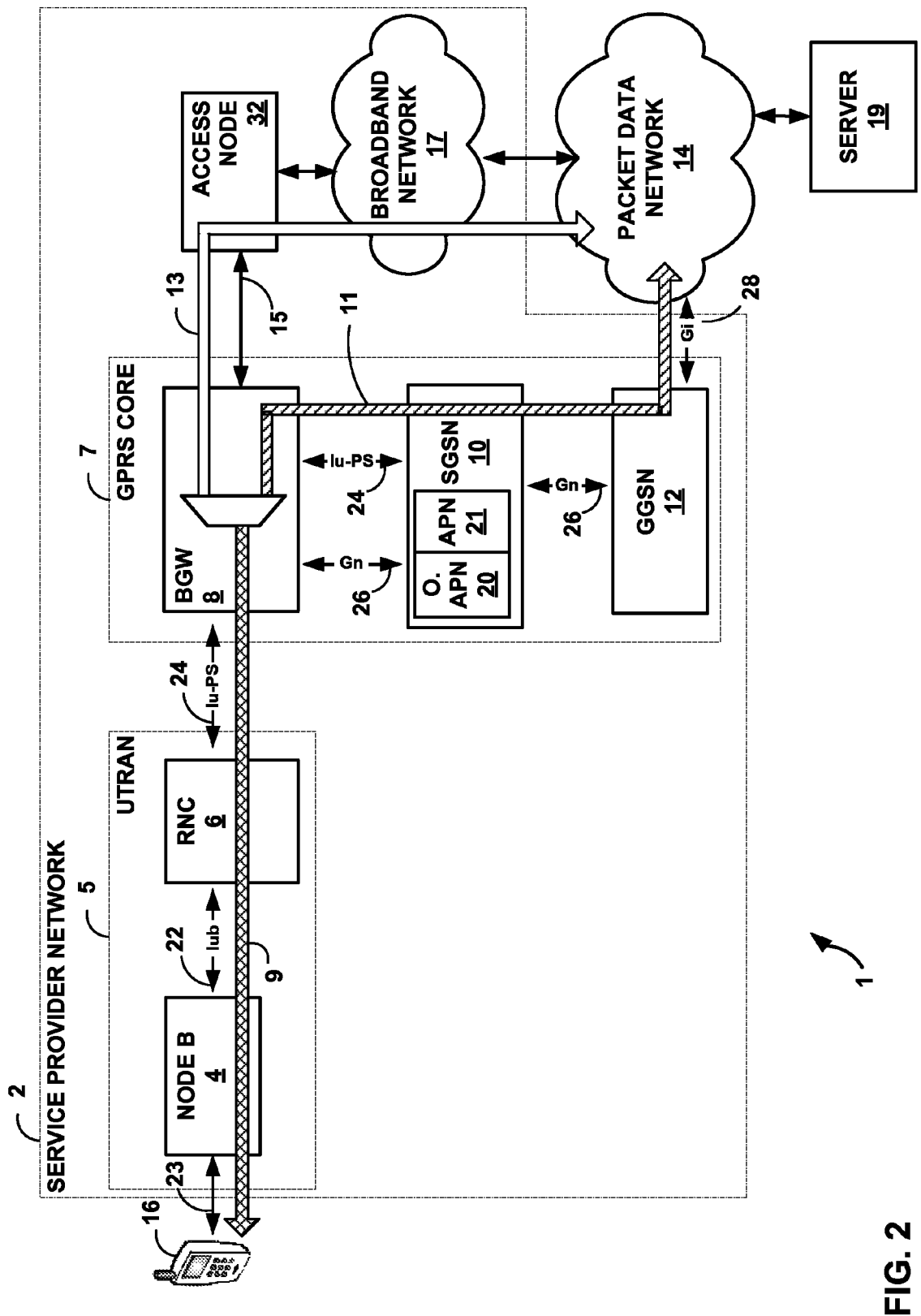
FIG. 2 is a block diagram illustrating an example network in which a breakout gateway and a service node cooperate to offload mobile traffic according to techniques herein described.

FIG. 2 is a block diagram illustrating an exemplary embodiment of network system 1 in further detail. In this example, mobile service provider network 2 comprises a Universal Mobile Telephony Service (UMTS) network that operates in accordance with the 3rd Generation Partnership Project (3GPP) standards and with the techniques described herein. For purposes of illustration, the techniques herein will be described with respect to a UMTS network. However, the techniques are applicable to other communication network types in other examples. For instance, the techniques are similarly applicable to network architectures and nodes deploying 3GPP/2, WiMAX, and Mobile IP based technologies and standards.

Mobile service provider network 2 includes a general packet radio service (GPRS) core packed-switched network 7 (hereinafter, "GPRS core network 7"), which illustrates an embodiment of mobile core network 7 of FIG. 1 in further detail. UMTS Terrestrial Radio Access Network (UTRAN) 5 illustrates an embodiment of radio access network 5 of FIG. 1 and is communicatively coupled to GPRS core network 7 via Iu-PS interface 24 operating over a communication link. The term "communication link," as used herein, comprises any form of transport medium, wired or wireless, and can include intermediate nodes such as network devices. UTRAN 5 represents an exemplary embodiment of radio access network 5 of FIG. 1.

GPRS core network 7 provides packet-switched (PS) services to UTRAN 5. For example, GPRS core network 7 provides packet routing and switching, as well as mobility management, authentication, and session management for mobile nodes in UTRAN 5. In some examples, mobile service provider network 2 may include additional nodes to further provide circuit-switched (CS) services. In such examples, mobile service provider network 2 further includes an Iu-CS interface (not shown) to communicatively couple the additional nodes to UTRAN 5 to enable real-time, circuit-switched communication.

The packet-switched services provided by GPRS core network 7 may include mobility services, such as authentication and roaming services, as well as call handling services, signaling, billing, and internetworking between GPRS core network 7 and external networks, such as PDN 14. In some examples, GPRS core network 7 is connected to one or more other carrier networks, such as the Internet and the Integrated Services Digital Network (ISDN).

Iu-PS interface 24 provides UTRAN 5 with access to core support services provided by GPRS core network 7. In general, Iu-PS interface 24 supports protocols that enable communication between UTRAN 5 and GPRS core network 7. In the example of mobile service provider network 2, Iu-PS interface 24 supports Signaling ATM Adaptation Layer (SAAL) and ATM Adaptation Layer 5 (AAL5) running over Asynchronous Transfer Mode (ATM). Iu-PS interface 24 further supports Radio Access Network Application Part (RANAP) for handling signaling/control between UTRAN 5 and GPRS core network 7, as well as the GPRS Tunneling Protocol (GTP) running over User Datagram Protocol (UDP) for transferring data.

Example UTRAN 5 provides wireless communication services for user equipment (UE), such as mobile device 16, and includes a Node B 4 that is connected to a radio network controller 6 ("RNC 6") via Iub interface 22 operating over a communication link. Node B 4 comprises a base transceiver station that uses an air interface to communicate with user equipment in the geographic region (or "cell") that Node B 4 serves. In some embodiments, Node B 4 comprises a femtocell. Mobile device 16 is located within the cell served by Node B 4. UTRAN 5 may, in some instances, comprise additional Node Bs, each of which may serve one of several cells. In some examples, Node B 4 may be another type of wireless transceiver station, such as a site controller or a WiMAX access point. User equipment, such as mobile device 16, may be referred to in alternative architectures as a mobile station (MS).

In UTRAN 5, Node B 4 is communicatively coupled to mobile device 16 using radio links 23. Specifically, mobile device 16 is in the cell served by Node B 4 and therefore exchanges data and control information with Node B 4 via radio link 23. Mobile device 16 has associated identifying information, such as a MAC address or subscriber identification. Subscriber identification may be, for example, a Mobile Subscriber ISDN Number (MSISDN) or an International Mobile Subscriber Identity (IMSI) stored, for instance, in a subscriber identity module (SIM).

RNC 6 manages Node B 4, routes data to/from Node B 4, and interfaces UTRAN 5 to GPRS core network 7 via Iu-PS interface 24. As such, RNC 6 executes protocols supported by Iu-PS interface 24 (e.g., GTP) and may therefore, for instance, establish and support GTP tunnels to nodes in GPRS core network 7. In some instances, RNC 6 comprises an IP router. In some aspects, UTRAN 5 may comprise additional RNCs and Node Bs variously arranged.

In the illustrated embodiment, GPRS core network 7 comprises serving GPRS support node 10 ("SGSN 10"), and gateway GPRS support node 12 ("GGSN 12"). GGSN 12 is a standard gateway node that connects GPRS core network 7 to PDN 14 via Gi interface 28 operating over a communication link. GGSN 12 enables access to one or more services provided by PDN 14 and maps accessible services to access point names (APNs). For example, GGSN 12 may comprise a data structure that maps APNs to the packet data protocol (PDP) addresses of the appropriate service nodes in PDN 14. In other examples, GGSN 12 forwards APNs that it receives in order to query a server for a PDP address of the appropriate service node.

As elements of enabling access to PDN 14, Gi interface 28 may provide one or more of authentication, accounting/billing, and authorization for mobile device 16 and users thereof. For example, GGSN 12 may comprise a Remote Authentication Dial-In User Service (RADIUS) client that connects to a RADIUS server (not shown), operating on Gi interface 28 and containing a database of user access credentials, such as username/password combinations. The RADIUS client may authenticate a user of mobile device 16 that is requesting a service from PDN 14.

In some embodiments, GGSN 12 connects to a Dynamic Host Configuration Protocol (DHCP) server (not shown) operating on Gi interface 28 to obtain a dynamically allocated PDP address for mobile device 16 during a PDP context activation. Using a DHCP server has the advantage of centralized administration of the available address pool.

In some embodiments, GGSN 12 comprises a PDP router (e.g., an IP router) and exposes an external PDP address for GPRS core network 7. In such instances, when mobile device 16 accesses PDN 14, GGSN 12 converts datagrams received from mobile device 16 to conform to a PDP (e.g., IP) executing on PDN 14 and inserts the external PDP address in the header of the converted packet to provide a routable return address for mobile device 16.

SGSN 10 switches mobile traffic for UTRAN 5 to available GGSNs, such as GGSN 12, in GPRS core network 7. GPRS support nodes (GSNs) of GPRS core network 7 communicate using Gn interface 26 operating over a communication link, which may comprise an IP network. Gn interface 26 thus uses Internet Protocol, such as IPv4 and/or IPv6, at the network layer of the Gn interface 26 protocol stack. In addition, SGSN 10 serves RNC 6, to which it is communicatively coupled via Iu-PS interface 24 operating over a communication link, and thus executes downstream protocols supported by Iu-PS interface 24 (e.g., GTP). Mobile device 16 connects to SGSN 10 during a GPRS attach procedure. Mobile device 16 sends identifying information to SGSN 10 via RNC 6, which SGSN 10 uses to authenticate the mobile device in cooperation with other GPRS core network 7 elements, such as a Home Location Register (HLR) (not shown).

SGSN 10 comprises APN 21, which maps a service associated with APN 21 to the routable address of GGSN 12 in GPRS core network 7. In general, an APN comprises a required network identifier and optional service and operator identifiers. For example, internet.mynetwork.com is an APN that identifies the Internet service on the mynetwork network. As another example, wap.mynetwork.com is an APN that identifies the WAP service on the mynetwork network. APN 21 comprises a string value that functions as a logical identifier for GGSN 12 and, by extension, Gi interface 28 and PDN 14. SGSN 10 may, in some instances, query a domain name server (DNS) (not shown) using the value for APN 21 to obtain an address for GGSN 12.

To establish a data connection to a service supported by PDN 14, mobile device 16 initiates a PDP-context activation procedure by sending signaling traffic to SGSN 10, which serves mobile device 16. The signaling traffic comprises the value of APN 21 corresponding to a service requested. As one example, the signaling traffic is an "activate PDP-context request message." SGSN 10 determines that the received value corresponds to APN 21 and maps APN 21 to GGSN 12. SGSN 10 establishes a GTP control (GTP-C) tunnel to GGSN 12 via Gn interface 26 and signals GGSN 12 with the PDP-context activation data that SGSN 10 received from mobile device 16, for example, in a "create PDP-context request" message. GGSN 12 then authorizes the mobile device 16 for a connection to PDN 14. For example, GGSN 12 may authenticate a user of mobile device 16 in cooperation with a RADIUS server.

Upon authorization of mobile device 16, GGSN 12 creates a PDP-context, then allocates and returns a PDP address that is routable by PDN 14. The PDP-context is a record of associations made between GGSN 12 and SGSN 10 and is present on both devices. The PDP-context describes characteristic of the connection, including the PDP of PDN 14, the value of APN 21, quality of service (QoS) negotiated, and accounting/billing statistics. The PDP address is an address that is routable using a PDP of PDN 14. For example, if the PDP is IPv6, the PDP address is an IPv6 address. The PDP address returned to mobile device 16 is alternatively referred to herein as an IP address assigned to mobile device 16. GGSN 12 also cooperates with SGSN 10 to establish a point-to-point, bi-directional first GTP user (GTP-U) tunnel to SGSN 10 for the PDP-context for APN 21.

SGSN 10 forwards the PDP address to mobile device 16 and establishes a second GTP-U tunnel to RNC 6 for the PDP-context for APN 21. SGSN 10 is now able to route user data between mobile device 16 and GGSN 12 as a terminal end of both the first and second GTP-U tunnels for the PDP-context associated with mobile device 16 and APN 21. Mobile device 16 uses the received PDP address as the source PDP address for communications to PDN 14 within the established PDP-context. Mobile device 16 may establish additional PDP-contexts for additional services supported by PDN 14.

In accordance with the techniques herein described, GPRS core network 7 further comprises breakout gateway 8 ("BGW 8") to cooperate with SGSN 10 to offload certain mobile traffic from GPRS core network 7 and on to broadband network 17. In the illustrated embodiment, BGW 8 is located between RNC 6 and SGSN 10 and initially functions as a relay agent between these devices.

BGW 8 is logically located on Iu-PS interface 24 to enable communication with RNC 6 and SGSN 10, which share Iu-PS interface 24 with BGW 8. During operation as a relay agent, BGW 8 forwards communications between RNC 6 and SGSN 10 over the Iu-PS interface 24. In some instances, BGW 8 merely inspects rather than relays communications between RNC 6 and SGSN 10. For example, BGW 8 and SGSN 10 may share an upstream, broadcast or multicast communication link with RNC 6. In some embodiments, BGW 8 is co-located with SGSN 10 or is a module of SGSN 10. For example, BGW 8 may be a service blade inserted into an SGSN 10 chassis to enable the techniques described herein.

In this example, BGW 8 is also logically located on Gn interface 26 and executes GTP. BGW 8 may terminate GTP tunnels to GSNs in GPRS core network 7, such as SGSN 10 and GGSN 12.

FIG. 2 additionally illustrates access node 32 and broadband network 17. BGW 8 is communicatively coupled to access node 32 via communication link 15. Access node 32 enables communication between GPRS core network 7 and broadband network 17. Broadband network 17 is a transport network enabling packet delivery at high-transmission rates to/from PDN 14. Broadband network 17, in various examples, may be an asymmetric digital subscriber line (DSL) network, WiMAX, a T-1 line, an Integrated Service Digital Network (ISDN), wired Ethernet, or other type of broadband network. Accordingly, access node 32 may be, in various examples, a WiMAX Access Service Network (ASN) Gateway, a Long Term Evolution (LTE) Service Architecture Evolution (SAE) gateway, a WiMax Connectivity Service Network (CSN) gateway, a LTE Packet Data Node (PDN) gateway, a broadband remote access server (BRAS), a femto gateway, a Security GateWay (SeGW), a Packet Data Gateway (PDG), an Evolved Packet Data Gateway (ePDG), or other type of network access node.

BGW 8, like GGSN 12, enables access for mobile device 16 to one or more services supported by PDN 14 and maps accessible services to access point names (APNs). For example, BGW 8 may comprise a data structure that maps APNs to the PDP addresses of the appropriate service nodes in PDN 14. In other examples, BGW 8 uses received APNs to query a server for a PDP address of the appropriate service node.

According to the described techniques, SGSN 10 further comprises offload APN 20 ("O. APN 20"), which, like APN 21, is a data structure that comprises a string value that identifies a service supported by PDN 14. However, unlike APN 21, SGSN 10 designates offload APN 20 as an offload APN that maps to BGW 8. That is, resolution of offload APN 20 provides a routable address (e.g., an IP address) for BGW 8. Offload APN 20 therefore allows SGSN 10 to address and redirect signaling traffic to BGW 8 as a mechanism for providing an alternative route for data traffic exchanged between mobile device 16 and PDN 14, effectively bypassing GGSN 12 and Gi interface 28. Offload APN 20 and APN 21 may each comprise, for example, a flag that is set to true when the respective APN is designated for offload, and set to false when the respective APN is not designated for offload. In some embodiments, offload APN 20 and APN 21 are entries in an APN table maintained by SGSN 10.

As mentioned above, BGW 8 functions as a relay agent between RNC 6 and SGSN 10 during an initial signaling phase for establishing a data path between mobile device 16 and PDN 14. Specifically, when mobile device 16 sends signaling (i.e., control plane) traffic to SGSN 10 via Iu-PS interface 24, such as an activate PDP-context request message, BGW 8 forwards the signaling data to SGSN 10 (also via Iu-PS interface 24).

SGSN 10 receives the signaling traffic and determines, when necessary, the specified APN to properly route the data to the appropriate serving node. Where the signaling traffic specifies offload APN 20, SGSN 10 maps offload APN 20 to an address for BGW 8. SGSN 10 then establishes a GTP-C tunnel to BGW 8 via Gn interface 26 and addresses and forwards the signaling traffic to BGW 8 through the GTP-C tunnel. SGSN 10, in effect, treats BGW 8 as a GGSN for the purpose of propagating the signaling traffic from mobile device 16 upstream, and SGSN 10 remains in the control path for the signaling traffic.

BGW 8 receives the signaling traffic addressed to it from SGSN 10 and creates a PDP-context for the data path between mobile device 16 and PDN 14. BGW 8 maps the APN provided in the signaling traffic (i.e., offload APN 20) to the appropriate service node in PDN 14 for use in routing data traffic received for the PDP-context. In addition, BGW 8 assigns a PDP address to mobile device 16 and installs a route for the PDP address in the routing information base of BGW 8. BGW 8 advertises this route to PDN 14, making mobile device 16 a routable address within the network. In addition, BGW 8 establishes a point-to-point, bi-directional first GTP-U tunnel to SGSN 10 for the PDP-context for offload APN 20. BGW 8 returns the PDP address to mobile device 16. In some embodiments, BGW 8 returns the PDP address to mobile device 16 in a "create PDP-context response" message sent to SGSN 10 via the first GTP-U tunnel. In some embodiments, BGW 8 connects to a Dynamic Host Configuration Protocol (DHCP) server (not shown) to obtain a dynamically allocated PDP address for mobile device 16 during a PDP context activation.

In some embodiments, however, mobile device 16 has a static PDP address. This may be possible, for example, where the PDP is IPv6 and there is a ready supply of addresses for mobile devices. In such embodiments, mobile device 16 may send its static PDP address to SGSN 10 in the activate PDP-context request. SGSN 10, in turn, forwards the static PDP address to BGW 8. BGW 8 associates the static PDP address for mobile device 16 with the PDP-context generated for the activate PDP-context request.

BGW 8 thus operates as a pseudo-GGSN in the control plane, for BGW 8 performs the signaling and other control plane functionality typically ascribed to a GGSN (e.g., GGSN 12). That is, BGW 8 serves as an access point to GPRS core network 7 for PDN 14, and is responsible for PDP address assignment to mobile device 16. In addition, BGW 8 creates a PDP-context and a first GTP-U tunnel for the data path for mobile data traffic addressed to offload APN 20.

SGSN 10 forwards the PDP address received from BGW 8 to mobile device 16 and establishes a second GTP-U tunnel to RNC 6 for the PDP-context for offload APN 20. SGSN 10 is now able to route user data between mobile device 16 and BGW 8 as a terminal end of both the first and second GTP-U tunnels for the PDP-context associated with mobile device 16 and offload APN 20. SGSN 10 continues to operate as the serving GSN for mobile device 16. Accordingly, mobile device 16 sends mobile data traffic to SGSN 10 via the second GTP-U tunnel, using the PDP address received from BGW 8 as the source PDP address and addressing the mobile data traffic to offload APN 20.

BGW 8 receives, on Iu-PS interface 24, mobile traffic destined for SGSN 10 from mobile device 16. That is, BGW 8 receives mobile traffic traversing the second GTP-U tunnel, on Iu-PS interface 24, between RNC 6 and SGSN 10. For example, BGW 8 receives such mobile traffic for the PDP-context for offload APN 20. Rather than simply relay the mobile traffic to SGSN 10, in accordance with the techniques of this disclosure, BGW 8 inspects the traffic to determine whether to offload the traffic to access node 32 and broadband network 17.

Specifically, BGW 8 first determines whether the mobile traffic is data traffic. In the example mobile service provider network 2 of FIG. 2, BGW 8 inspects the GTP header of the mobile traffic to determine whether the traffic comprises GTP-U traffic traversing a GTP-U tunnel, such as the second GTP-U tunnel for the PDP-context for offload APN 20 between RNC 6 and SGSN 10.

If the mobile traffic is not data traffic, BGW 8 forwards the mobile traffic to the appropriate destination (e.g., SGSN 10) without further inspection. For example, the mobile traffic may comprise RANAP signaling traffic to SGSN 10, which BGW 8 relays to SGSN 10.

If the mobile traffic is mobile data traffic, BGW 8 further inspects the mobile traffic to determine the PDP address from which the traffic is sourced. BGW 8, for instance, examines the GTP-U payload carried by the GTP-U packet. The GTP-U payload is a PDP packet being tunneled by GTP-U and includes a PDP header (e.g., an IP header) and a PDP payload. BGW 8 obtains the source PDP address from the PDP header.

After obtaining the source PDP address for the mobile data traffic, BGW 8 compares the source PDP address to a list of PDP addresses that BGW 8 has allocated to mobile devices, such as mobile device 16. If the source PDP address is an address that BGW 8 has previously allocated, or is a static PDP address received by BGW 8 from mobile device 16, this indicates that BGW 8 has assumed the role of a GGSN for the PDP-context corresponding to this mobile data traffic. That is, BGW 8 serves as the access point to GPRS core network 7 for PDN 14 for this PDP-context and thus is a routing point for the traffic in previously established data path. By mapping the source PDP address to a PDP address that BGW 8 has previously allocated, BGW 8 is able to distinguish between mobile data traffic that is routed to PDN 14 through GGSN 12 and mobile data traffic that is routed to PDN 14 through BGW 8 (operating as a pseudo-GGSN).

For example, if the source PDP address is the PDP address that BGW 8 allocated for the PDP-context associated with offload APN 20 for mobile device 16, then BGW 8 is a terminal point for the first GTP-U tunnel shared with SGSN 10. The data path established for that PDP-context thus encompasses both SGSN 10 and BGW 8, and BGW 8 would again receive mobile traffic (returned from SGSN 10 on Gn interface 26). However, rather than forward the mobile data traffic sourced by the PDP address to SGSN 10, BGW 8 bypasses SGSN 10 by sending the mobile data traffic to access node 32, according to the techniques of this disclosure. In this manner, BGW 8 bypasses additional GSNs (e.g., SGSN 10 and GGSN 12) of GPRS core network 7 and offloads the mobile data traffic to broadband network 17 for transport to PDN 14 along offload data path 13.

If the source PDP address of the mobile data traffic is not an address that BGW 8 has previously allocated, this indicates that GGSN 12 is the access point for the PDP-context corresponding to this mobile data traffic. Accordingly, BGW 8 forwards the traffic to SGSN 10 for transport by GPRS core network 7 to PDN 14 along standard data path 11.

As described above, in establishing a data path for the PDP-context associated with offload APN 20 for mobile device 16, SGSN 10 terminates two GTP-U tunnels. The first tunnel operates over Gn interface 26 and is terminated by BGW 8 operating as a pseudo-GGSN. The second tunnel operates over Iu-PS interface 24 and is terminated by RNC 6. This second tunnel is routed through BGW 8.

In some embodiments, both RNC 6 and BGW 8 are PDP routers (e.g., IP routers). In such embodiments, SGSN 10 may eliminate itself from the data path for the PDP-context associated with offload APN 20 for mobile device 16. In this example, SGSN 10 establishes a direct GTP-U tunnel from RNC 6 to BGW 8 over Iu-PS interface 24 by using the direct-tunnel capability of RNC 6. As a result, mobile data traffic for the PDP-context associated with offload APN 20 is addressed by RNC 6 directly to BGW 8. Consequently, BGW 8 may offload the mobile data traffic to access node 32 and broadband network 17 without first having to traverse the GTP protocol stack to determine the source PDP address for the mobile data traffic and map, where appropriate, the source PDP address to a PDP address previously assigned to mobile device 16. SGSN 10 remains in the control path, however, to modify the tunnel if mobile device 16 moves to a different Node B that is served by an RNC other than RNC 6. That is, SGSN 10 continues to perform mobility management.

By performing the techniques of this disclosure in this manner, BGW 8 and SGSN 10 may cooperate to offload mobile data traffic that does not require services provided by GPRS core network 7 to an offload network (e.g., broadband network 17) that does not apply such services. As a result, the techniques may reduce service bandwidth and general bandwidth requirements of GPRS core network 7, which may relieve the operator of GPRS core network 7 of costs associated with providing such bandwidth, including capital outlays for additional GSNs and communication links, administrative costs, and the like. The operator of GPRS core network 7 may reserve expensive packet processing services to mobile data traffic that actually requires such services. In addition, the techniques described maintain the presence of SGSN 10 within the control path between RNC 6 and BGW 8, which preserves mobility and other features of the mobile infrastructure.

Figure 3:
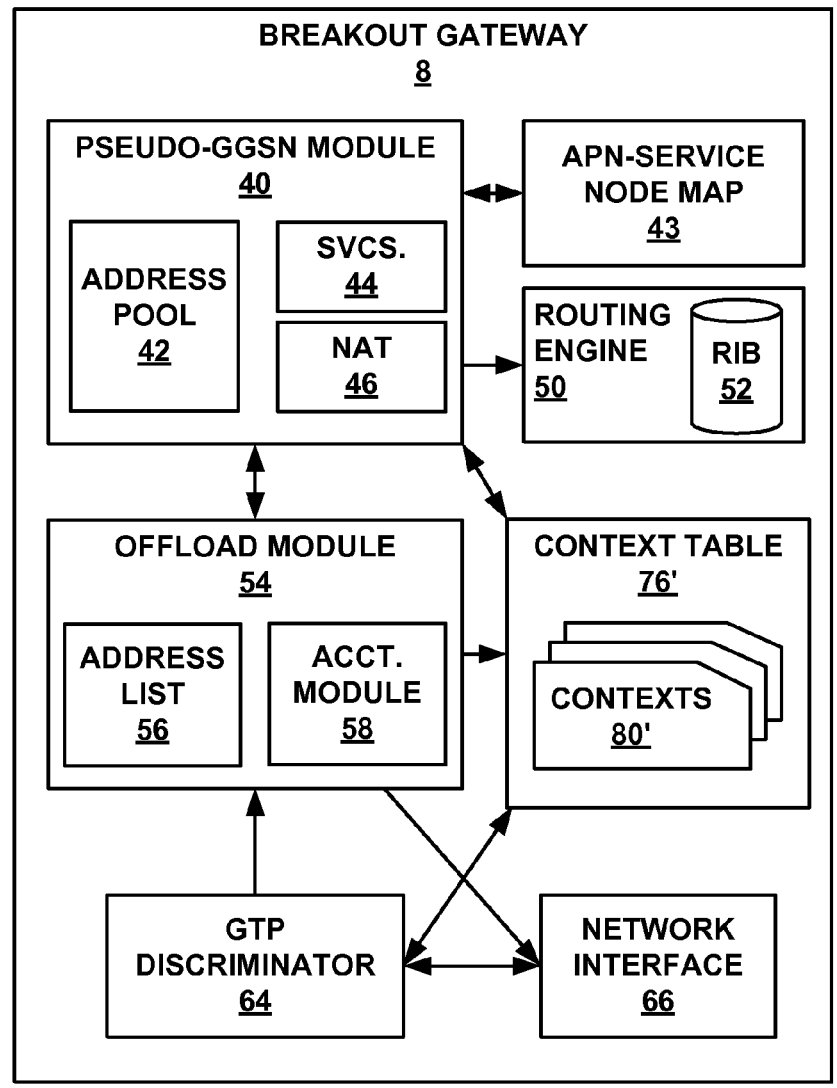
FIG. 3 is a block diagram illustrating the breakout gateway of FIG. 2 in greater detail.

FIG. 3 is a block diagram illustrating exemplary breakout gateway 8 ("BGW 8") of FIG. 2 in greater detail. BGW 8 comprises pseudo-GGSN module 40, routing engine 50, context table 76', and network interface 66.

Network interface 66 sends and receives communications over Iu-PS interface 24 and Gn interface 26 for BGW 8. Network interface 66 is coupled to one or more wired or wireless communication links (not shown) that transport communications for the interfaces.

Pseudo-GGSN module 40 enables BGW 8 to operate as a pseudo-GGSN on GPRS core network 7 (as illustrated in FIG. 2) by performing functions associated with GGSNs, including PDP address assignment, application of services, and operating as a gateway to external packet data networks, such as PDN 14. Pseudo-GGSN module 40 executes protocols supported by Iu-PS interface 24 and Gn interface 26.

Pseudo-GGSN module 40, in some embodiments, comprises services 44 ("SVCS. 44"), which BGW 8 may apply to mobile data traffic traversing a communication link between BGW 8 and access node 32. Services 44 may comprise, for instance, intrusion detection and prevention to secure GPRS core network 7, load balancing of packet flows, aggregation, traffic policing, billing, and other services.

Routing engine 50 performs PDP routing and forwarding functions for BGW 8, including managing routing information base 52 ("RIB 52"), executing routing protocols, and controlling BGW 8 interfaces (e.g., network interface 66). For example, routing engine 50 may support the Internet Protocol and execute one or more IP-based routing protocols, such as Open Shortest Path First (OSPF) or Routing Information Protocol (RIP). Routing engine 50 may receive route advertisements from other PDP-capable routers carrying routing information that routing engine 50 installs into RIB 52. In addition, routing engine 50 may leverage routes stored in RIB 52 to generate and install additional routes to network locations identified by PDP addresses assigned by pseudo-GGSN module 40, then advertise such routes during routing protocol execution.

Context table 76' stores PDP-contexts 80' (illustrated as "contexts 80'"), which each maintain a record describing associations between BGW 8, SGSN 10, and mobile device 16. For example, each one of contexts 80' may store information for a particular PDP-context, including the PDP of the associated mobile device and identifiers for any GTP tunnels established to facilitate a communication session between the associated mobile device and an external PDN.

BGW 8 further comprises access point name-service node map 43 ("APN-Service Node map 43"), which is a data structure that stores entries mapping access point names to addresses of service nodes in PDN 14. APN-service node map 43 may comprise a table, linked list, or other mapping data structure stored as a database, flat file, or other storage abstraction. In some embodiments, APN-service node map 43 resides on a server that, when queried by BGW 8, returns the corresponding service node address for a given access point name.

Example pseudo-GGSN module 40 additionally comprises address pool 42, a list of PDP addresses available for pseudo-GGSN module 40 to assign to mobile devices. In some embodiments, PDP addresses held in address pool 42 are routable on PDN 14. In some embodiments, PDP addresses held in address pool 42 are routable within GPRS core network 7 but not necessarily within PDN 14. In such embodiments, network address translation (NAT) module 46 performs NAT services for incoming and outgoing data packet to enable connectivity between nodes of mobile service provider network 2, such as mobile device 16, and nodes of PDN 14.

In some embodiments, BGW 8 obtains a PDP address for assignation to a mobile device from a DHCP server. In some embodiments, BGW 8 uses authentication credentials provided by mobile device 16, such as a subscriber user/password pair, to request a PDP address from an authentication, authorization and accounting (AAA) server. The AAA server may be, for instance, a RADIUS server.

BGW 8 receives signaling traffic, via a GTP-C tunnel from SGSN 10, that includes a request to create a data connection for mobile device 16 to PDN 14. Packet data network 14 is identified by an access point name in the request. Pseudo-GGSN module 40 adds a PDP-context to contexts 80' for the data connection. Pseudo-GGSN module 40 queries APN-service node map 34 to obtain an address for the appropriate service node for the access point name. Pseudo-GGSN module 40 returns the address for the service node to mobile device 16 for use as a destination address for mobile data traffic sourced by mobile device 16. In some embodiments, pseudo-GGSN 40 directs routing engine 50 to install a route in RIB 52 that specifies an address of access node 32 as the next hop for the PDP address of the service node.

In addition, pseudo-GGSN module 40 assigns mobile device 16 a PDP address from address pool 42 and directs routing engine 50 to install a route for this address. To maintain a record of the PDP address assigned, pseudo-GGSN module 40 inserts the assigned PDP into address list 56 of offload module 54. BGW 8 returns the assigned PDP address to SGSN 10, via the GTP-C tunnel, for forwarding to mobile device 16.

In some embodiments, mobile device 16 sends BGW 8 a static PDP address to use as a destination address for routing traffic from PDN 14 or GPRS core network 7. In these embodiments, pseudo-GGSN module 40 inserts the provided static PDP address into address list 56. In addition, pseudo-GGSN module 40 directs routing engine 50 to create a routing entry for the static PDP address in RIB 52.

BGW 8 further comprises offload module 54 and GTP discriminator 64, which cooperate to perform mobile data offload techniques of this disclosure. GTP discriminator 64 receives GTP traffic, destined for SGSN 10, from network interface 66 and analyzes the GTP header to determine whether the traffic is GTP-U traffic. If the header specifies GTP-C, GTP discriminator 64 forwards the traffic to SGSN 10 without further inspection. If the header specifies GTP-U, the traffic is user data traffic and is a candidate for offloading. GTP discriminator 64 decapsulates one or more PDP packets from the GTP-U data traffic and sends the packets to offload module 54, which determines whether to offload the data traffic.

Offload module 54 comprises address list 56, which maintains a record of PDP addresses that pseudo-GGSN 40 has assigned to various mobile devices in mobile service provider network 2 and static PDP addresses that BGW 8 has received from mobile devices. Offload module 54 receives a PDP packet decapsulated by GTP discriminator 64 and obtains the source PDP address for the packet specified by the PDP header. Offload module 54 then determines whether the source PDP address is present in address list 56. If so, the data traffic is to be offloaded by BGW 8 onto broadband network 17. Accordingly, offload module 54 directs pseudo-GGSN module 40 to route the PDP packets to PDN 14 via access node 32. If the source PDP address is not present in address list 56, however, offload module 54 directs network interface 66 to forward the GTP-U data traffic to SGSN 10.

In some embodiments, pseudo-GGSN module 40 establishes a direct GTP-U tunnel with RNC 6 for offload mobile data traffic. In such instances, BGW 8 received GTP-U data traffic addressed to it from RNC 6, via direct GTP-U tunnel. Offload module 54 may, in such instances, bypass GTP discriminator and direct pseudo-GGSN 40 to offload the PDP packets received in the data traffic to broadband network 17.

Offload module 54 additionally comprises accounting module 58 ("acct. module 58") to compile statistics regarding offloaded data traffic for billing. For each PDP-context in contexts 80', accounting module 58 tallies the amount data traffic associated with the PDP-context that is offloaded to broadband network 17. Accounting module 58 sends offloaded data traffic tallies for contexts 80' to a billing server for billing to the associated subscribers. Accounting module 58 thus performs functions conventionally performed by GGSN 12 operating on Gi interface 28.

Figure 4:
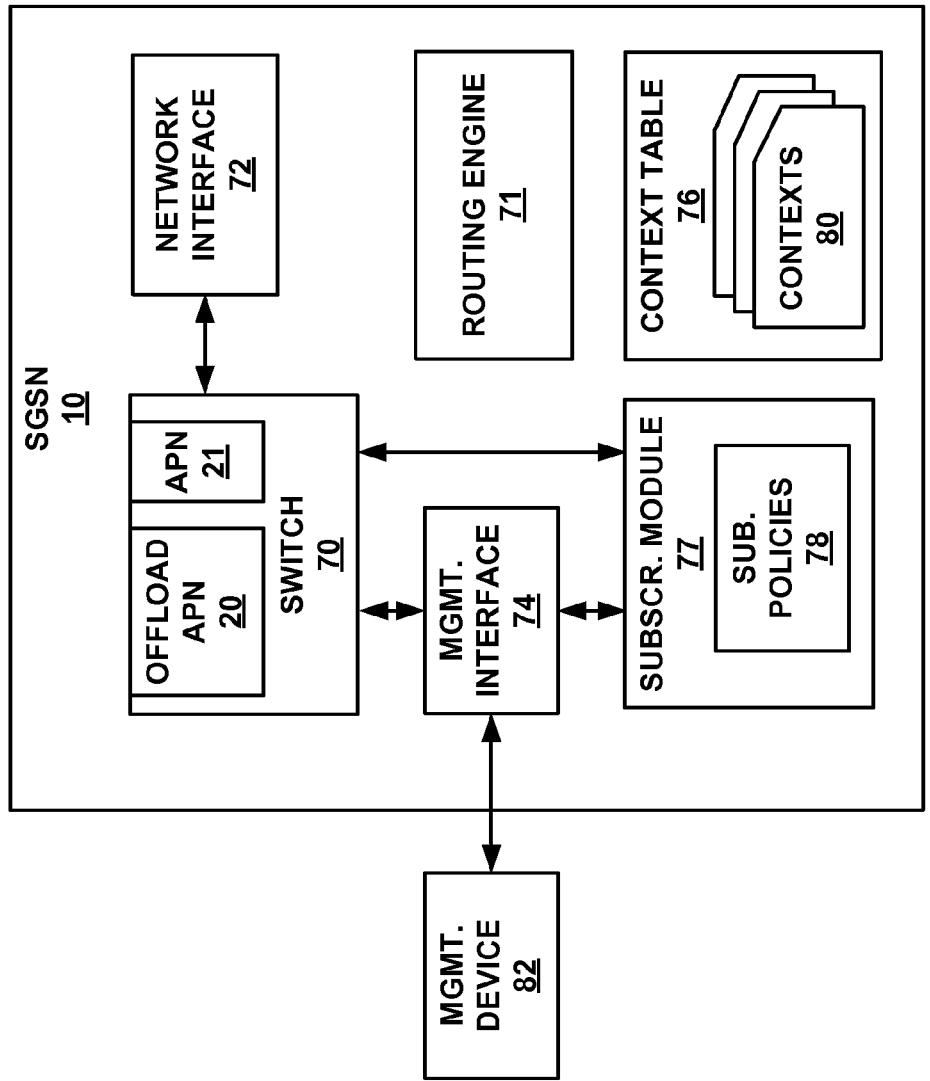
FIG. 4 is a block diagram illustrating the service node of FIG. 2 in greater detail.

FIG. 4 is a block diagram illustrating an example of SGSN 10 of FIG. 2 in further detail, as well as a management device 82 ("mgmt. device 82"). Management device 82 provides a management client that enables an administrator to modify, via management interface 74, configuration of an SGSN 10. "Administrator," as used herein, may refer to a person or a software agent.

SGSN 10 comprises network interface 72, management interface 74 ("mgmt. interface 74"), routing engine 71, and switch 70. Network interface 72 sends and receives communications over Gn interface 26 and Iu-PS interface 24. Network interface 72 is coupled to one or more wired or wireless communication links (not shown) that transport communications for Gn interface 26. Routing engine 71 performs PDP routing and forwarding functions for SGSN 10.

Switch 70 executes protocols for Gn interface 26 and Iu-PS interface 24. Switch 70 additionally maps access point names to addresses of GGSNs to enable SGSN 10 to route communications received from mobile device 16 over Iu-PS interface 24 to the appropriate gateway. Example switch 70 includes offload APN 20 and APN 21. Offload APN 20 and APN 21 are each associated with a service offered by PDN 14, and requests for data connections to such a service from mobile device 16 invoke the appropriate APN for that service. For example, APN 21 may be associated with a VoIP service. An application executing on mobile device 16 that requires VoIP services sends a service request to SGSN 10 specifying APN 21. APN 21 comprises a string value mapped to GGSN 12, while offload APN 20 comprises a string value mapped to BGW 8. In this manner, SGSN 10 exposes offload APN 20 and APN 21 to mobile device 16 to enable mobile device 16 to request a service facilitated by GPRS core network 7 using an APN rather than a routing address of a gateway GSN.

When SGSN 10 receives a service request, such as an activate PDP-context request, specifying an APN, switch 70 resolves the APN to the mapped gateway GSN. Specifically, if the value of the APN specified is the value of offload APN 20, then switch 70 resolves the APN to BGW 8. However, if the value of the APN specified is the value of APN 21, then switch 70 resolves the APN to GGSN 12. Any of the APNs resolved by switch 70 may be designated for offload and, thus, resolution to BGW 8. In the example of SGSN 10, offload APN 20 is designated for offload, while APN 21 is not. In some embodiments, SGSN 10 queries a server (e.g., a DNS server) using the value of an APN received in a service request to obtain an address for the appropriate gateway GSN.

Management interface 74 exposes methods and properties that enables management device 82 to modify the configuration of APNs resolved by switch 70. Network interface 72 exchanges communications with management device 82 over a communication link to facilitate the use of management interface 74 by management device 74. An administrator operating management device 82 may designate, via management interface 74, any of the APNs for offload or for standard routing through GPRS core network 7. For example, an administrator may reconfigure example offload APN 20 to designate it for standard routing. After this reconfiguration, offload APN 20 resolves to GGSN 12.

In some embodiments, APNs resolved by switch 70 map to a class of service. Classes of service (CoS) define Quality of Service (Qos) traffic classes based on, for instance, delay, jitter, bandwidth, and reliability. In such embodiments, an administrator may designate a particular class of service for offload. For example, an administrator may designate "background" services, such as email downloading or file transfer, for offload. Higher-class services, such as media streaming, may require routing through GPRS core network 7 and thus be left undesignated. Rather than individually designating APNs for offload, therefore, the administrator may designate the class to which the APNs are mapped. As one example, if APN 21 maps to the background CoS and the background CoS is designated for offload, then APN 21 is also designated for offload by proxy.

Context table 76 stores PDP-contexts 80 (illustrated as "contexts 80"), which each maintain a record describing associations between BGW 8, SGSN 10, GGSN 12 and/or mobile device 16. For example, each one of contexts 80 may store information for a particular PDP-context, including the PDP of the associated mobile device and identifiers for any GTP tunnels established to facilitate a communication session between the associated mobile device and an external PDN accessed via the associated gateway GSN.

Switch 70 additionally performs GTP tunnel establishment and management. After resolving an APN received in a service request, switch 70 establishes a GTP-C tunnel and forwards the service request to the appropriate gateway GSN. The forwarded service request may comprise a create PDP-context request. In accordance with the techniques of this disclosure, when SGSN 10 receives the value of offload APN 20 in the service request, switch 70 sends the service request to BGW 8 to enable offloading of mobile data traffic, for the service requested, onto broadband network 17.

When SGSN 10 receives a response message that accepts the forwarded service request, switch 70 establishes GTP-U tunnels to RNC 6 and the gateway GSN for the service in order to create a standard data path from mobile device 16 to PDN 14. For example, when the service requested specifies APN 21, SGSN 10 establishes a GTP-U tunnel to GGSN 12. In addition, SGSN 10 forwards a received PDP address, if present in the response message, to mobile device 16 via Iu-PS interface 24.

By establishing GTP tunnels in this manner, SGSN 10 remains in the control path for data communication between mobile device 16 and PDN 14 even when BGW 8 offloads mobile data traffic to broadband network 17. As a result, SGSN 10 retains the conventional mobility management functionality of a serving GSN for mobile devices in mobile service provider network 2.

Example SGSN 10 further comprises subscriber module 77 ("subscr. module 77"), which stores subscriber policies 78 ("subscr. policies 78") that include configuration information for subscribers associated with mobile devices, including mobile device 16, in mobile service provider network 2. Such mobile devices may establish PDP-contexts with SGSN 10 as an aspect of facilitating a data connection between a mobile device and PDN 14.

Subscriber policies 78 include a data structure that enables an administrator to designate mobile data traffic for offload at the subscriber level. Each of subscriber policies 78 may associate a subscriber with one of a number of possible service levels, where each service level specifies whether any of APNs of switch 70 are to be offloaded for that service level. In some embodiments, each of subscriber policies 78 may designate any of the APNs of switch 70 for offload for the associated subscriber, permitting still finer-grained designations. Management interface 74 exposes methods that allow an administrator, using management device 82, to add, delete, or modify any of subscriber policies 78 to designate certain APNs of switch 70 for offload in the manner described. In this way, the administrator may further the service policies of an operator of mobile service provider network 2. Some embodiments of SGSN 10 do not include subscriber policies 78 and thus do not permit subscriber-based designations of APNs for offload.

Figure 5:
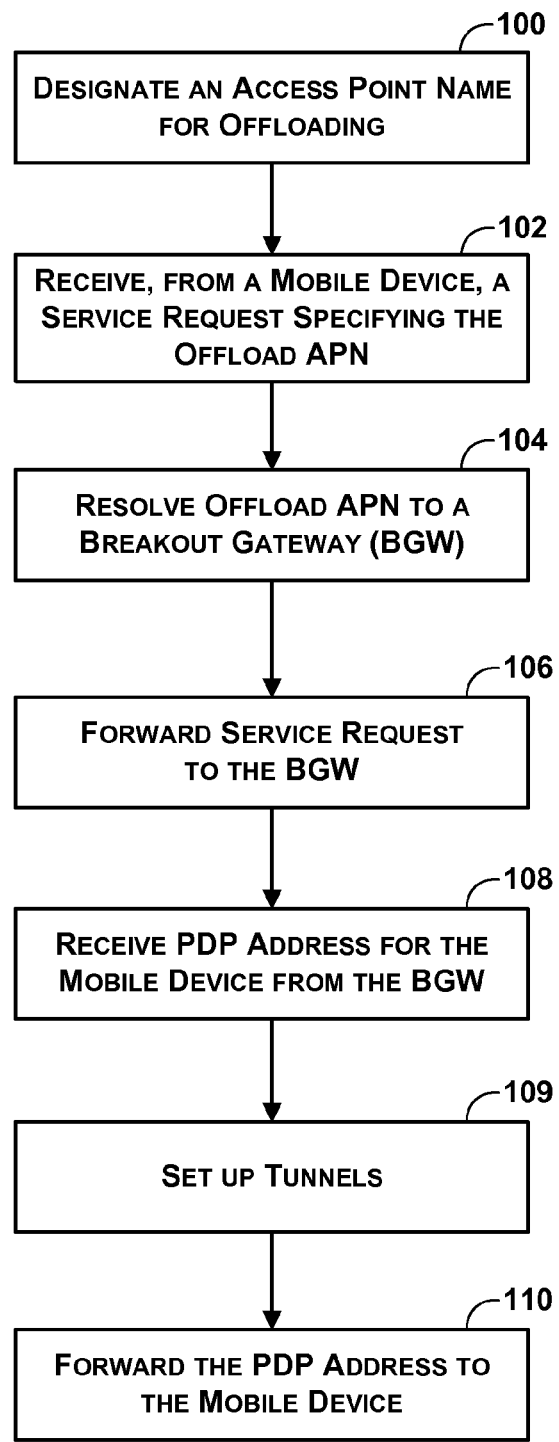
FIG. 5 is a flowchart illustrating an exemplary operation of the service node of FIG. 2 to establish an offloading data path for mobile traffic in accordance with the described techniques.

FIG. 5 is a flowchart illustrating an exemplary operation of SGSN 10 to establish an offloading data path for mobile traffic in accordance with the described techniques. Initially, an administrator designates an access point name, offload APN 20, mapped by SGSN 10 for offloading onto broadband network 17 (100). SGSN 10 receives, in the control plane via network interface 72, a service request from mobile device 16 that includes the value of offload APN 20, which specifies the requested service (102). Switch 70 resolves the value of offload APN 20 to an address of BGW 8 (104), which serves as a gateway to broadband network 17, and forwards the service request to BGW 8 (106).

SGSN 10 receives a response from BGW 8, which includes a PDP address assigned by BGW 8 for mobile device 16 (108). Switch 70 establishes one or more tunnels in the data plane to establish an offloading data path to BGW 8 (109). For example, switch 70 establishes a first data tunnel to BGW 8, and a second tunnel to RNC 6. In another example, switch 70 establishes a single data tunnel between RNC 6 and BGW 8. Then, switch 70 forwards the PDP address to mobile device 16 (110). Mobile device 16 uses the PDP address as the source address for data packets sent through the data tunnels and destined for PDN 14.

Figure 6:
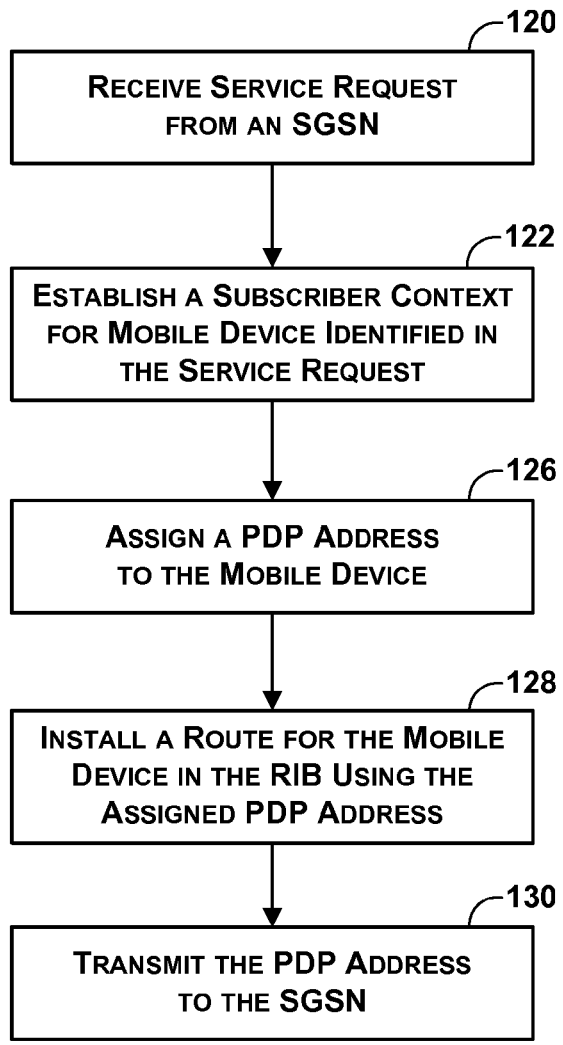
FIG. 6 is a flowchart illustrating an exemplary operation of the breakout gateway of FIG. 2 to establish an offloading data path for mobile traffic in accordance with the described techniques.

FIG. 6 is a flowchart illustrating an exemplary operation of BGW 8 to establish an offloading data path for mobile traffic in accordance with the described techniques. BGW 8 receives, in the control plane via network interface 66, a service request from SGSN 10 (120). Pseudo-GGSN module 40 adds a subscriber context, e.g., a PDP-context, to context table 76' for mobile device 16 identified in the service request (122). In addition, pseudo-GGSN module 40 assigns a PDP address for the mobile device 16 for use in the subscriber context (126). BGW 8 may comprise a pool of PDP addresses from which the PDP address is assigned (e.g., address pool 42), or BGW 8 may, in some aspects, obtain the PDP address from a server. Pseudo-GGSN module 40 installs a route for assigned PDP address in RIB 52 to advertise BGW 8 as a node on the forwarding path from PDN 14 to mobile device 16 (128). Pseudo-GGSN module 40 also transmits the PDP address to SGSN 10 in a service request response (130). SGSN 10 forwards the PDP address to mobile device 16.

Figure 7:
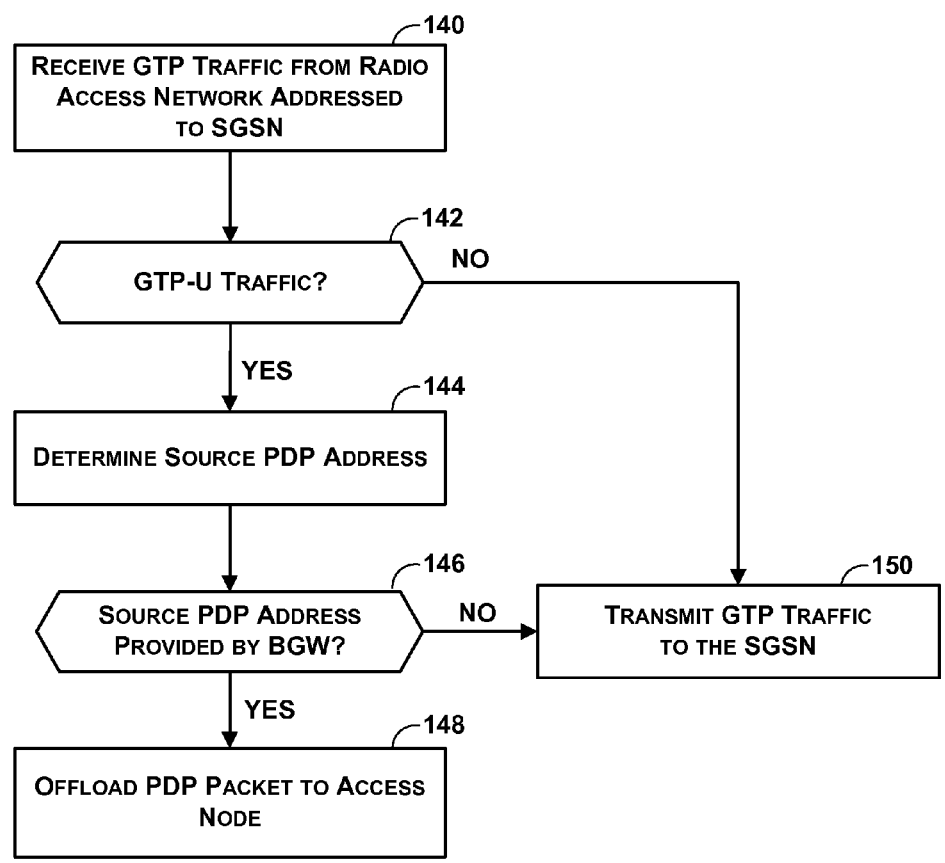
FIG. 7 is a flowchart illustrating an example mode of operation of the breakout gateway of FIG. 2 to offload mobile traffic according to the techniques described.

FIG. 7 is a flowchart illustrating an example mode of operation of BGW 8 to offload data traffic traversing BGW 8 onto broadband network 17. BGW 8 is a node on the forwarding path from a radio access network to SGSN 10 and thus receives GTP traffic from RNC 6 addressed to SGSN 10 (140). GTP discriminator 64 inspects the GTP header of the GTP traffic to determine whether the GTP traffic is GTP-U traffic (142). If the GTP traffic is GTP-C traffic (NO branch of 142), offload module 54 forwards the GTP traffic to SGSN 10 (150). If, however, the GTP header specifies GTP-U traffic (YES branch of 142), then offload module 54 inspects the GTP payload, which comprises a PDP packet, to determine the source PDP address from the PDP header of the PDP packet (144). Offload module 54 uses the source PDP address to perform a lookup in address list 56. If the source PDP address is present in the address list 56, this indicates that the source PDP address is an address that has been assigned by pseudo-GGSN module 40 (YES branch of 148), and offload module 54 sends the PDP packet to access node 32, thereby offloading the GTP-U payload (i.e., the mobile data traffic) to broadband network 17 for transport to PDN 14. If the source PDP address is not one that has been assigned by pseudo-GGSN module 40 (i.e., the source IP address is not present in address list 56) (NO branch of 148), offload module 54 forwards the GTP traffic to SGSN 10.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, with a breakout gateway device of a mobile service provider network and from a serving node of a mobile core network of the mobile service provider network, a service request that specifies a requested service;
in response to receiving the service request, sending a service response from the breakout gateway device to the serving node, wherein the service response includes a packet data protocol (PDP) address for a mobile device;
receiving, with the breakout gateway device, data traffic associated with the requested service and the mobile device from a radio access network of the mobile service provider network, wherein the data traffic is destined for a packet data network (PDN) and sourced by the PDP address for the mobile device; and
bypassing the serving node by sending the data traffic from the breakout gateway device to an access node of an offload network that provides at least part of an access path from the radio access network to the PDN.

2. The method of claim 1, further comprising:
determining whether a source PDP address of the data traffic is the PDP address for the mobile device; and
upon determining the source PDP address of the data traffic is the PDP address for the mobile device, sending the data traffic from the breakout gateway device to the access node of the offload network.

3. The method of claim 1, further comprising:
receiving, with the breakout gateway device, additional data traffic associated with the requested service, wherein the data traffic is destined for the PDN;
determining, with the breakout gateway device, whether a source PDP address of the data traffic is the PDP address for the mobile device; and
upon determining the source PDP address of the data traffic is not the PDP address for the mobile device, sending the data traffic from the breakout gateway device to the serving node of the mobile core network, wherein the serving node is positioned on an access path from the radio access network to the PDN within the mobile core of the mobile service provider network.

4. The method of claim 1,
wherein the service request comprises one of a Create PDP Context Request or a Create Session Request, and
wherein the service response comprises one of a Create PDP Context Response or a Create Session Response.

5. The method of claim 1, wherein the serving node comprises one of a Serving Gateway Support Node of a Universal Mobile Telephony Service network or Serving Gateway of an Evolved Packet Core of a Long-Term Evolution network.

6. The method of claim 1, wherein the breakout gateway device is logically positioned on an Iu-PS interface shared by a controller for the radio access network and the serving node.

7. The method of claim 1, wherein the breakout gateway device is logically positioned on a forwarding path from the radio access network to the serving node.

8. The method of claim 1, wherein the data traffic does not have a source network address of the serving node.

9. The method of claim 1, further comprising:
establishing, with the breakout gateway device, a direct tunnel with the radio access network to cause the radio access network to address the data traffic to the breakout gateway device.

10. The method of claim 1, where in the service request is addressed to the breakout gateway device.

11. A method comprising:
receiving, with a serving node that couples a mobile core network of a mobile service provider network to a radio access network to provide an access path for the radio access network to a packet data network (PDN), a first service request, wherein the first service request specifies a requested service supported by the PDN and comprises an access point name;
determining, with the serving node, whether the access point name is designated for offload in the serving node;
in response to determining that the access point name of the first service request is designated for offload in the serving node, sending a second service request from the serving node to a breakout gateway device of the mobile service provider network; and
in response to determining that the access point name of the first service request is not designated for offload in the serving node, sending the second service request to a gateway node of the mobile service provider network.

12. The method of claim 11, further comprising:
designating the access point name for offload based at least on a class of service associated with the access point name.

13. The method of claim 11, further comprising:
designating the access point name for offload based at least on a subscriber policy for a mobile device that issued the first service request.

14. A breakout gateway device of a mobile service provider network, the breakout gateway device comprising:
a network interface configured to receive, from a serving node of a mobile core network of the mobile service provider network, a service request that is addressed to the breakout gateway device and that specifies a requested service,
wherein the network interface is configured to send, in response to receiving the service request and to the serving node, a service response that includes a packet data protocol (PDP) address for a mobile device, wherein the network interface is configured to receive data traffic associated with the requested service and the mobile device from a radio access network of the mobile service provider network, wherein the data traffic is destined for a packet data network (PDN) and sourced by the PDP address for the mobile device; and an offload module configured to bypass the serving node by sending the data traffic to an access node of an offload network that provides at least part of an access path from the radio access network to the PDN.

15. The breakout gateway device of claim 14, wherein the offload module is configured to determine whether a source PDP address of the data traffic is the PDP address for the mobile device and, upon determining the source PDP address of the data traffic is the PDP address for the mobile device, send the data traffic to the access node of the offload network.

16. The breakout gateway device of claim 14, wherein the network interface is configured to receive additional data traffic associated with the requested service, wherein the data traffic is destined for the PDN, and wherein the offload module is configured to determine whether a source PDP address of the data traffic is the PDP address for the mobile device and, upon determining the source PDP address of the data traffic is not the PDP address for the mobile device, send the data traffic to the serving node of the mobile core network.

17. The breakout gateway device of claim 14, wherein the offload module is configured to establish a direct tunnel with the radio access network to cause the radio access network to address the data traffic to the breakout gateway device.

18. The breakout gateway device of claim 14, wherein the service request comprises one of a Create PDP Context Request or a Create Session Request, and wherein the service response comprises one of a Create PDP Context Response or a Create Session Response.

19. The breakout gateway device of claim 14, wherein the breakout gateway device is logically positioned on an Iu-PS interface shared by a controller for the radio access network and the serving node.

20. The breakout gateway device of claim 14, where in the service request is addressed to the breakout gateway device.

\* \* \* \* \*